(12) United States Patent
Krumbacher et al.

(10) Patent No.: US 10,513,029 B2
(45) Date of Patent: Dec. 24, 2019

(54) TRANSMISSION, ELECTRIC DRIVING DEVICE, AND INDUSTRIAL ROBOT

(71) Applicant: KUKA Deutschland GmbH, Augsburg (DE)

(72) Inventors: Rainer Krumbacher, Rettenbach (DE); Franz Liebl, Aichach (DE)

(73) Assignee: KUKA Deutschland GmbH, Augsburg (DE)

( * ) Notice: Subject to any disclaimer, the term of this patent is extended or adjusted under 35 U.S.C. 154(b) by 295 days.

(21) Appl. No.: 15/543,050

(22) PCT Filed: Jan. 12, 2016

(86) PCT No.: PCT/EP2016/050478
§ 371 (c)(1),
(2) Date: Oct. 10, 2017

(87) PCT Pub. No.: WO2016/113259
PCT Pub. Date: Jul. 21, 2016

(65) Prior Publication Data
US 2019/0126464 A1    May 2, 2019

(30) Foreign Application Priority Data
Jan. 13, 2015    (DE) .......................... 10 2015 200 374

(51) Int. Cl.
*B25J 9/10*    (2006.01)
*B25J 17/02*    (2006.01)
(Continued)

(52) U.S. Cl.
CPC ......... *B25J 9/1025* (2013.01); *B25J 17/0258* (2013.01); *F16H 37/0826* (2013.01); *F16H 49/001* (2013.01); *F16H 2057/005* (2013.01)

(58) Field of Classification Search
CPC ...... B25J 9/102; B25J 9/1025; B25J 17/0258; F16H 37/06; F16H 37/065; F16H 37/08;
(Continued)

(56) References Cited

U.S. PATENT DOCUMENTS 4,502,830 A    3/1985    Inaba et al.
4,594,049 A *  6/1986    Terauchi .................. B25J 9/042
                                                414/730
(Continued)

FOREIGN PATENT DOCUMENTS

DE    102010016952 A1    1/2011
DE    102013008757 A1    12/2013
(Continued)

OTHER PUBLICATIONS

Machine translation of WO 2014/081105 A1 obtained on Jun. 25, 2019.*
(Continued)

*Primary Examiner* — Adam D Rogers
(74) *Attorney, Agent, or Firm* — Dorton & Willis, LLP (57) ABSTRACT

The invention relates to a transmission, to a transmission housing, to a driving member mounted rotatably in the transmission housing, to an output member mounted rotatably in the transmission housing and to at least one speed-changing transmission stage which couples the output member to the driving member and has a torque-supporting member, wherein the driving member together with the output member and the torque-supporting member forms a preassembled assembly in which the torque-supporting member is mounted rotatably on the transmission housing by means of a transmission-stage rolling bearing device and has a toothing which is in engagement with a driving pinion mounted rotatably in the transmission housing. The inven-
(Continued)

tion also relates to an electric driving device and to an industrial robot having at least one such transmission.

17 Claims, 8 Drawing Sheets

(51) Int. Cl.
  *F16H 37/02* (2006.01)
  *F16H 37/08* (2006.01)
  *F16H 49/00* (2006.01)
  *F16H 57/00* (2012.01)
(58) Field of Classification Search
  CPC ............... F16H 37/0826; F16H 49/001; F16H 2049/003; F16H 2057/005
  See application file for complete search history.

(56) References Cited

U.S. PATENT DOCUMENTS

| | | | | | |
|---|---|---|---|---|---|
| 4,684,312 | A | * | 8/1987 | Antoszewski | B25J 9/08 414/735 |
| 5,984,048 | A | * | 11/1999 | Kiyosawa | F16H 49/001 184/6.12 |
| 8,157,691 | B2 | * | 4/2012 | Stanovskoy | F16H 1/08 475/180 |
| 8,590,415 | B2 | * | 11/2013 | Long | B25J 9/102 74/490.05 |
| 8,616,086 | B2 | * | 12/2013 | Hirai | B25J 9/1025 74/640 |
| 8,910,539 | B2 | * | 12/2014 | Long | B25J 9/102 74/490.01 |
| 8,960,042 | B2 | * | 2/2015 | Liu | B25J 9/102 74/490.03 |
| 2002/0007697 | A1 | * | 1/2002 | Tanioka | F16H 49/001 74/640 |
| 2002/0026852 | A1 | * | 3/2002 | Kiyosawa | F16H 49/001 74/640 |
| 2012/0176007 | A1 | * | 7/2012 | Takeuchi | H02K 7/116 310/68 B |
| 2013/0184112 | A1 | * | 7/2013 | Choi | F16H 37/065 475/5 |
| 2015/0300472 | A1 | | 10/2015 | Park et al. | |

FOREIGN PATENT DOCUMENTS

| | | |
|---|---|---|
| EP | 0048904 A1 | 4/1982 |
| WO | 2008077678 A1 | 7/2008 |
| WO | 2014081105 A1 | 5/2014 |

OTHER PUBLICATIONS

European Patent Office; Office Action in related European Patent Application No. 16700432.4 dated Nov. 7, 2018; 5 pages.
European Patent Office; Search Report and Written Opinion in International Patent Application No. PCT/EP2016/050478 dated Mar. 9, 2016; 12 pages.

* cited by examiner

TRANSMISSION, ELECTRIC DRIVING DEVICE, AND INDUSTRIAL ROBOT

CROSS-REFERENCE

This application is a national phase application under 35 U.S.C. § 371 of International Patent Application No. PCT/EP2016/050478, filed Jan. 12, 2016 (pending), which claims the benefit of German Patent Application No. DE 10 2015 200 374.4 filed Jan. 13, 2015, the disclosures of which are incorporated by reference herein in their entirety.

TECHNICAL FIELD

The invention relates to a transmission, comprising a transmission housing, a driving member that is mounted rotatably in the transmission housing, an output member that is mounted rotatably in the transmission housing, and at least one speed-changing transmission stage that couples the output member to the driving member and comprises a torque supporting member. The invention also relates to an electric driving device and an industrial robot.

BACKGROUND

The published document DE 10 2013 008 757 A1 describes a wrist unit of an industrial robot, said wrist unit comprising a first wrist element, which is mounted rotatably about a first axial line at a first joint of a front end side of a robot arm; a second wrist element that is mounted rotatably about a second axial line at a second joint of a front end side of the first wrist element, wherein the second axial line is not located on an extension of the first axial line and is not parallel to the first axial line; a third wrist element that is mounted rotatably about a third axial line at a third joint of a front end side of the second wrist element, wherein the third axial line is not located on an extension of the second axial line and does not extend parallel to the second axial line; a driving motor for the second wrist, where said motor is provided on the first wrist element or the robot arm, in order to control the second wrist element; a driving motor for the third wrist, where said motor is provided on the first wrist element or the robot arm, in order to control the third wrist element; an eccentrically oscillating speed-changing transmission that is provided at the second joint in such a way that an axial center line of rotation fits together with the second axial line, in order to slow down a rotation of the driving motor for the second wrist and to transmit to the second wrist element, wherein the eccentrically oscillating speed-changing transmission comprises a hollow shaping member that forms a hollow body along the axial center line of rotation; and a through shaft that is mounted rotatably on the hollow shaping member and extends through the hollow body, in order to transmit a rotation from the driving motor for the third wrist from one side of the first wrist element to a side of the second wrist element; a plurality of crankshafts that are arranged around the through shaft, wherein the plurality of crankshafts comprises input gearwheels provided at the ends of the side of the first wrist element; and a transmission member that is provided centrally in a manner allowing rotation about the axial center line of rotation, wherein the transmission member comprises a first gearwheel, to which a rotational force is supplied by the driving motor for the second wrist element, and a second gearwheel, with which the input gearwheels of the plurality of crankshafts are in engagement.

The published document DE 10 2010 016 952 A1 discloses a harmonic drive reduction gear for a robot, with a housing, comprising a frame, formed in the housing; a circular spline fixed to the frame and having an edge region that is provided with internal gear teeth; a cylindrical flex spline that is inserted into the circular spline and that has an outer edge area, which is provided with external gear teeth meshing with the internal gear teeth, wherein the flex spline is connected to an output shaft; and an elliptical wave generator, which is fitted into the flex spline and which is connected to a drive shaft.

The object of the present invention is to provide a transmission and an electric driving device, in particular, an industrial robot with such a transmission or such an electric driving device, with the transmission and the electric driving device respectively being compact and, in particular, also light.

SUMMARY

The engineering object of the invention is achieved by means of a transmission, comprising a transmission housing; a driving member that is mounted rotatably in the transmission housing; an output member that is mounted rotatably in the transmission housing; and at least one speed-changing transmission stage that couples the output member to the driving member and comprises a torque supporting member, wherein the driving member forms a preassembled subassembly together with the output member and the torque supporting member, and in this preassembled subassembly the torque supporting member is mounted rotatably on the transmission housing by means of a transmission stage rolling bearing device and comprises gear teeth, which are in engagement with a driving pinion that is mounted rotatably in the transmission housing.

Due to the fact that the driving member together with the output member and the torque supporting member forms a preassembled subassembly, in which the torque supporting member is mounted rotatably on the transmission housing by means of a transmission stage rolling bearing device and has gear teeth, which are in engagement with a driving pinion that is mounted rotatably in the transmission housing, a compact and, in particular, also a light transmission is provided, in which, in particular, the preassembled subassembly consisting of the driving member, the output member and the torque supporting member is built very compact, and yet a wide range of transmission concepts of the whole transmission can be implemented. Such variability is achieved, in particular, by the fact that the torque supporting member is mounted rotatably on the transmission housing by means of a transmission stage rolling bearing device and has gear teeth, which are in engagement with a driving pinion that is mounted rotatably in the transmission housing.

If, according to the above, the driving member of the preassembled subassembly is mounted rotatably in the transmission housing, then this means, in particular, that it is not rotatably mounted immediately and directly on a housing half of the transmission housing, but rather that the driving member is rotatably mounted directly in the preassembled subassembly and is mounted rotatably in turn indirectly in the transmission housing by means of the bearing arrangement of the subassembly.

The situation is the same with the output member of the preassembled subassembly. If, therefore, the output member of the preassembled subassembly is rotatably mounted accordingly in the transmission housing, then this means, in particular, that it is not rotatably mounted immediately and directly on a housing half of the transmission housing, but rather that the output member is rotatably mounted directly in the preassembled subassembly and is mounted rotatably in turn indirectly in the transmission housing by means of the bearing arrangement of the subassembly.

The speed-changing transmission stage is part of the preassembled subassembly. The speed-changing transmission stage can be designed to be one or more stages. The speed-changing transmission stage can be formed by different types of transmission stages. The speed-changing transmission stage transmits and converts a torque, introduced by the driving member, at a transmission ratio and forwards it to the output member. In this way the speed-changing transmission stage can be formed, for example, by just a mating of two meshing gearwheels, where the one gearwheel is connected directly to the driving member, and the other gearwheel is connected directly to the output member. This may be, for example, a single stage spur gear stage. However, the speed-changing transmission stage may also be, for example, a planetary gear stage or a harmonic drive reduction gear (strain wave gear). If, however, the speed-changing transmission stage does not have a harmonic drive reduction gear (strain wave gear), then the elements that are a part of the reduction gear, in particular, the driving member and the output member may be made of a rigid material, i.e., inflexible material. The elements that are involved in the speed-changing transmission stage, in particular the driving member and the output member, may be designed so as to be rigid, i.e., inflexible. The speed-changing transmission stage may be, for example, a single stage or multi-stage spur gear. The driving member and/or the output member may be designed so as to be circular, i.e., may have, in particular, a circular circumferential contour. A motor, in particular, an electric motor or rather a drive may be connected directly to the driving member by means of a drive shaft. The motor, in particular, the electric motor or the drive may be connected to the driving member without an interpositioned harmonic drive reduction gear (strain wave gear).

In order for the driving member to form a preassembled subassembly together with the output member and the torque supporting member, the output member and/or the driving member may be mounted rotatably on the torque supporting member, for example, by means of at least one rolling bearing. In addition, the rotatable output member and/or the driving member may be sealed against the torque supporting member. In order to make tight, it is possible, for example, to dispose a radial shaft sealing ring between the output member and the torque supporting member or the driving member and the torque supporting member.

In order to form a driving member of the transmission, the driving member of the preassembled subassembly has to be rotatable relative to the transmission housing. In this context, in order to form an output member of the transmission, the output member of the preassembled subassembly must also be rotatable relative to the transmission housing. However, the torque supporting member of the preassembled subassembly could or should be rigidly fixed on the transmission housing in an obvious way. However, it is provided in accordance with the invention that the torque supporting member of the preassembled subassembly is mounted rotatably with respect to the transmission housing. For this purpose there is provided an inventive transmission stage rolling bearing device, by means of which the torque supporting member is mounted rotatably with respect to the transmission housing.

In order to be able to variably rotate the torque supporting member relative to the transmission housing, the torque supporting member also has, according to the invention, gear teeth, which are in engagement with a driving pinion that is mounted rotatably in the transmission housing. The gear teeth may be a belt drive or spur gear teeth. The spur gear teeth may be, for example, straight teeth, helical teeth or double helical teeth.

The driving pinion is part of the transmission, but separate from the preassembled subassembly. In this respect the driving pinion is mounted separately in the transmission housing in a manner allowing rotation. In a simple case the driving pinion may be seated on a motor shaft of an electric motor, in particular, a motor of the electric driving device in accordance with the invention. As an alternative, the driving pinion can be formed by the gear teeth of a second preassembled subassembly consisting of the driving member, the output member and the torque supporting member, in particular, by the gear teeth on the torque supporting member of a second preassembled subassembly.

The driving member may be mounted rotatably on the output member by means a driving member rolling bearing device. The driving member rolling bearing device may be formed by one or more grooved ball bearings, cross roller bearings, four-point bearings, (axial/radial) roller bearings, angular contact ball bearings, tapered roller bearings and/or angular contact roller bearings or its combinations. The driving member rolling bearing device may be assigned a dynamic seal, in particular, at least one radial shaft sealing ring that seals a gap between the driving member and the output member and/or the torque supporting member.

The output member may be mounted rotatably on the torque supporting member by means of an output member rolling bearing device. The output member rolling bearing device may be formed by one or more grooved ball bearings, cross roller bearings, four-point bearings, (axial/radial) roller bearings, angular contact ball bearings, tapered roller bearings and/or angular contact roller bearings or its combinations. The output member rolling bearing device may be assigned a dynamic seal, in particular, at least one radial shaft sealing ring that seals a gap between the output member and the torque supporting member.

The torque supporting member may be formed by a support ring, which coaxially surrounds the driving member and/or the output member and which comprises an outer peripheral wall, which bears at least one rolling body inner race of the transmission stage rolling bearing device. To this end a separate inner ring of a transmission stage rolling bearing can be pressed or clamped onto the torque supporting member, and said inner ring bears the rolling body inner race. As an alternative, the rolling body inner race can be applied directly to the outer peripheral wall of the torque supporting member. In this respect the outer peripheral wall of the torque supporting member or at least that portion of the outer peripheral wall of the torque supporting member that has the rolling body inner race is heat treated and/or hardened. The transmission stage rolling bearing device or rather the transmission stage rolling bearing may be formed by one or more grooved ball bearings, cross roller bearings, four-point bearings, (axial/radial) roller bearings, angular contact ball bearings, tapered roller bearings and/or angular contact roller bearings or its combinations. The torque supporting member may comprise a flange surface, to which an output member or a driving member, in particular, a link of a robot arm is flanged. In this context the torque supporting member may comprise one or more flange holes or stud bolts, in order to screw in the output member, the driving member, in particular, the link of the robot arm. As an alternative or in addition, the torque supporting member may also be connected or fastened to the output member and/or the driving member by adhesive bonding and/or shrink fitting.

The transmission stage rolling bearing device may comprise an outer ring, which is flanged to the transmission housing and which comprises at least one rolling body outer race on its inner peripheral wall. In this context a separate outer ring of the transmission stage rolling bearing, which bears the rolling body outer race, can be press-fitted or clamped in the outer ring. As an alternative, the rolling body outer race may be applied directly to an inner peripheral wall of the outer ring. In this case the inner peripheral wall of the outer ring or at least that portion of the inner peripheral wall of the outer ring that has the rolling body outer race may be heat treated and/or hardened. The outer ring may be assigned a dynamic seal, in particular, at least one radial shaft sealing ring that seals a gap between the outer ring and the torque supporting member. The transmission may comprise a static seal that seals the outer ring against the transmission housing. The static seal may be, for example, an O-ring or a flat gasket.

The transmission may comprise a dynamic seal, which seals the outer ring against the torque supporting member, where said dynamic seal is, in particular, a radial shaft sealing ring, which seals the outer ring against the torque supporting member.

In a first embodiment variant the speed-changing transmission stage may comprise a strain wave gear, which comprises a rigid outer ring, which is connected to the torque supporting member or is integrally formed and has internal gear teeth; a flexible output bushing that is connected to the output member and has external gear teeth; and a wave generator that rolls on the flexible output bushing and that is connected to the driving member, wherein the external gear teeth of the flexible output bushing are in meshing engagement with the internal gear teeth of the rigid outer ring, as a function of a rotational movement of the wave generator.

The strain wave gear may comprise a rigid outer ring (circular spline) with internal gear teeth, where said outer ring is arranged on the torque supporting member, is connected to said torque supporting member or is formed, in particular, in one piece on said torque supporting member; a flexible output bushing (the flex spline), which has external gear teeth and which is connected to the output member of the preassembled subassembly; and a rotatable wave generator that rolls on the flexible output bushing and that is connected to the driving member of the preassembled subassembly, wherein the external gear teeth of the flexible output bushing are in meshing engagement with the internal gear teeth of the rigid outer ring as a function of a rotational movement of the wave generator.

The driving member of the preassembled subassembly can be fastened to the drive shaft of an electric motor. For this purpose the driving member of the preassembled subassembly may be pushed onto the drive shaft of the electric motor, for example, by means of a spline shaft profile in a rotationally fixed manner. As an alternative or in addition, the fixing may also be carried out by shrinking, screwing, gluing, by means of at least one spline key and/or by means of at least one cone.

In a second embodiment variant the speed-changing transmission stage may comprise at least one planetary gear stage.

In a third embodiment variant the speed-changing transmission stage may comprise at least one cycloid gear stage.

In addition, the invention relates to an electric driving device, comprising a first electric motor with a primary drive shaft; a transmission, as described in accordance with one or more of the disclosed embodiments of inventive transmissions, wherein the primary drive shaft of the first electric motor is connected to the driving member of the transmission; and comprising a second electric motor with a secondary drive shaft, which is connected to the driving pinion of the transmission.

The electric driving device comprises accordingly at least two electric motors and at least one inventive transmission. The at least two electric motors are arranged, in particular, are mounted or attached or flanged in the transmission housing or to the transmission housing of the transmission. The first electric motor introduces with its primary drive shaft a torque into the transmission by way of the driving member; and this torque, which is converted by means of the speed-changing transmission stage of the transmission, is discharged to the output member of the transmission. The torque supporting member is controlled by the second electric motor with its secondary drive shaft, which is coupled to the driving pinion that is in engagement with the gear teeth of the torque supporting member. The driving pinion may be seated, for example, directly on the secondary drive shaft of the second electric motor.

In general, the transmission housing may form at least partially a robot arm or, more specifically, a link of the robot arm. In this respect the transmission housing may have a bearing function. That is, the forces and the moments, which are to be transmitted by way of the robot arm or, more specifically, the links of the robot arm, may be passed through the transmission housing.

In this case the output member may comprise a flange or may form a flange, to which a machine member that is to be moved, in particular, a link of a robot arm, may be attached. In addition, the torque supporting member may comprise an additional flange or may form an additional flange, to which a second machine member that is to be moved, in particular, a second link of the robot arm, may be attached. The output member and the torque supporting member may be arranged, in particular, coaxially to each other. Correspondingly two machine members, in particular, two links of the robot arm, may be arranged coaxially to each other in a manner allowing rotation.

The invention also relates to an electric driving device, comprising a first electric motor with a primary drive shaft; a first transmission as described above, wherein the primary drive shaft of the first electric motor is connected to a primary driving member of the first transmission by way of a first belt drive; and comprising a second electric motor with a secondary drive shaft; a second transmission comprising a rotatably mounted secondary driving member, to which the secondary drive shaft of the second electric motor is connected by means of a second belt drive; a rotatably mounted secondary torque supporting member, which bears the driving pinion of the first transmission and at least one secondary speed-changing transmission stage, which couples the secondary torque supporting member to the secondary driving member and which comprises a secondary output member, wherein the secondary driving member forms a second preassembled subassembly together with the secondary output member and the secondary torque supporting member; and the secondary output member is fastened to the transmission housing of the first transmission.

This electric driving device comprises accordingly at least two electric motors and at least one inventive transmission. The at least two electric motors are arranged, in particular, are mounted or attached or flanged in the transmission housing or to the transmission housing of the transmission. The first electric motor introduces with its primary drive shaft a torque into the transmission by way of the primary driving member; and this torque, which is converted by the speed-changing transmission stage of the transmission, is discharged to the primary output member of the transmission. The second electric motor passes with its secondary drive shaft a torque into the second transmission by way of the secondary driving member; and this torque, which is converted by a dedicated speed-changing transmission stage, is discharged to the secondary output member of the second transmission. In this embodiment variant the secondary output member bears the driving pinion. The driving pinion in turn is in direct or indirect engagement with the gear teeth of the torque supporting member of the first transmission, for example, by way of an intermediate gear or a belt. In this case the torque supporting member of the second transmission is fixed in the transmission housing.

In this case the output member of the first transmission may bear a driving gearwheel, in particular, a driving bevel gear, which is in direct or indirect engagement with an output gearwheel, in particular, an output bevel gear, wherein the output gearwheel or, more specifically, the output bevel gear is connected to a machine member, which is to be moved, in particular, a link of a robot arm. In the case of a robot arm this link may be a tool flange of the robot arm. This tool flange is then mounted rotatably in a hand housing of the robot arm. The hand housing in turn is then connected to the torque supporting member of the first transmission and rotatably mounted by means of said torque supporting member. For this purpose the torque supporting member may comprise an additional flange or may form an additional flange, to which the robot arm's hand housing, which is to be move, is attached.

Furthermore, the invention relates to an industrial robot, comprising a robot controller, which is designed and/or configured to execute a robot program, as well as comprising a robot arm with a plurality of links, which are connected by means of joints that are automated in accordance with the robot program, or are automatically adjustable in a manual operating mode, and comprising at least one transmission, as described in accordance with one or more of the disclosed embodiments of transmissions according to the invention, in particular, an electric driving device, as described in accordance with one or more of the disclosed embodiments of electric driving devices of the invention, said transmission or said electric driving device being designed to adjust at least one of the joints, in particular, two joints of the robot arm that follow one another directly in the kinematic chain.

Industrial robots are working machines that can be equipped with tools for automatic handling and/or processing of objects and by means of their joints are programmable in several axes of motion, for example, with regard to orientation, position and process sequence.

The industrial robot comprises the robot arm and a programmable controller (control device) that controls or regulates the sequence of movements of the industrial robot while the industrial robot is in operation by moving one or more automatically or manually adjustable joints (robot axes) by means of, in particular, electric drives or motors, in that the controller controls or regulates the drives.

Robot arms may comprise, among other things, a frame and a carousel, which is mounted rotatably relative to the frame by means of a joint and on which a rocker is mounted pivotably by means of another joint. In this case a boom arm in turn may be mounted pivotably on the rocker by means of another joint. In this context the boom arm bears a robot hand, where in this respect the boom arm and/or the robot hand may comprise several additional joints.

The robot arm, comprising a plurality of links connected by joints, may be configured as an articulated arm robot with a plurality of links and joints that are arranged serially one after the other; in particular, the robot arm may be designed as a six-axis articulated arm robot.

The drive may be, in particular, an electric drive, which comprises a rotor with an electric rotor winding and a drive shaft and a stator with an electric stator winding, which may be housed, in particular, in a drive housing. The rotor may be connected, in particular, to an input member of the transmission by connecting the drive shaft, in particular, a hollow shaft of the drive to a hollow transmission shaft of the transmission or even by integrally forming therewith as a common hollow shaft.

In general, a single joint of the robot arm may comprise an inventive transmission; or two or more, in particular, also all of the joints of the manipulator arm may comprise an inventive transmission. An inventive joint is, or two joints are, described in detail below as representative of all of the joints of the robot arm.

In a specific embodiment variant of the industrial robot, the robot arm may comprise a hollow shaft robot hand, which comprises at least one rotatable hollow shaft that is connected to one of the links, in particular, the flange of the robot arm, and comprising a hollow member, which comprises at least one feedthrough that is connected to one of the links, as well as a supply line that is passed through both the feedthrough and also the hollow shaft, wherein a first inventive transmission, as described in accordance with one embodiment, and a second inventive transmission, as described in accordance with one embodiment, are positioned between the hollow shaft robot hand and the hollow member in the kinematic chain of the plurality of links and joints of the robot arm; and the first transmission and the second transmission, as well as, in particular, also their associated electric motors, are arranged in the link or at the link so as to be offset from the supply line in such a way that in one joint position of the robot arm, in which the axis of the hollow shaft is aligned with the axis of the hollow member, the supply line can be guided in a straight alignment past the first transmission and the second transmission.

The hollow member may be, in particular, an arm member, which is mounted on a wrist in a manner allowing rotation about its axis. In this case the first transmission and the second transmission can be designed to move two hand axes. Due to the fact that both the hollow member as well as the first transmission and the second transmission are components of the same joint, the geometric arrangement or, more specifically, the structural arrangement of the first transmission and the second transmission is fixed with respect to the feedthrough of the hollow member. Then the first transmission and the second transmission as well as, in particular, their associated electric motors are arranged in such an embodiment so as to be offset from the axis of the hollow member in such a way that the supply line freely passes the first transmission and the second transmission when said supply line extends or is guided in a straight line along the aligned axes to the hollow shaft or rather to the flange of the robot arm. Even the arm member itself, which comprises the hollow member, may have a shape that is formed in such a way that the supply line can freely pass, when said supply line extends or rather is guided in a straight line along the aligned axes to the hollow shaft or rather to the flange of the robot arm.

The supply line may comprise, in particular, electric, hydraulic and/or pneumatic lines or cables. Correspondingly the supply line may comprise one or more of such individual lines. For this purpose the one or more individual lines may be combined to form a bundle of lines that form the supply line. To this end the supply line may be provided with a protective tube. The protective tube may be a corrugated tube surrounding the individual lines and/or the bundle of lines. A number of exemplary embodiments of the invention are shown in the accompanying schematic drawings solely for illustrative purposes. Specific features of these exemplary embodiments may be, also when viewed, if appropriate, individually or in combination, general features of the invention, independently of the actual context, in which they are mentioned.

DETAILED DESCRIPTION

Figure 1:
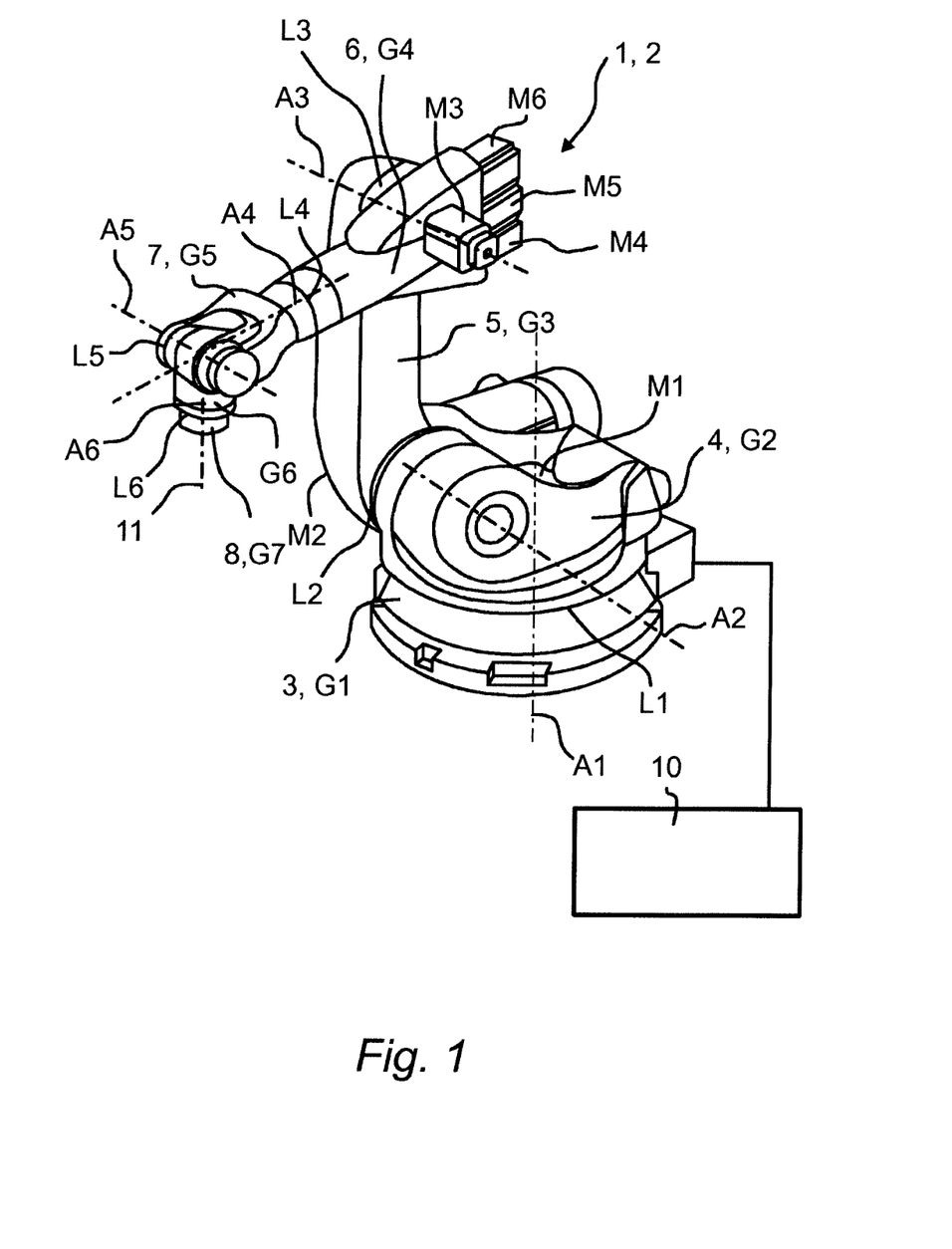
FIG. 1 is a perspective view of an industrial robot that comprises a robot arm and a robot controller.

FIG. 1 shows an industrial robot 1 that comprises a robot arm 2 and a robot controller 10. In the case of the present exemplary embodiment the robot arm 2 comprises a plurality of sequential links G1 to G7 that are connected to each other by joints L1 to L6 in a manner allowing rotation.

The robot controller 10 of the industrial robot 1 is designed or, more specifically, is configured to execute a robot program, by means of which the joints L1 to L6 of the robot arm 2 can be automated according to the robot program or automatically adjusted or, more specifically, can be rotationally moved in a manual operating mode. For this purpose the robot controller 10 is connected to controllable electric drives M1 to M6 that are designed to adjust the joints L1 to L6 of the industrial robot 1.

In the case of the present exemplary embodiment the links G1 to G7 are a frame 3 and a carousel 4 that is mounted rotatably about a vertically extending axis A1 relative to the frame 3. Other links of the robot arm 2 are a rocker 5, a boom arm 6 and a preferably multi-axis robot hand 7 with a fastening device, which is designed as a flange 8 and which is intended for fastening a tool 11. At the lower end of the rocker, i.e., at the joint L2 of the rocker 5, which can also be referred to as a rocker bearing head, the rocker 5 is mounted on the carousel 4 so as to be able to pivot about a preferably horizontal axis of rotation A2. At the upper end of the rocker 5 the boom arm 6 in turn is mounted on the first joint L3 of the rocker 5 so as to be able to pivot about a likewise preferably horizontal axis A3 of the boom arm 6. Said boom arm bears at the end the robot hand 7 with its preferably three axes of rotation A4, A5, A6. Each of the joints L1 to L6 can be driven by one of the electric drives M1 to M6, respectively, by means of the robot controller 10 under program control. For this purpose an inventive transmission 12 can generally be provided between each of the links G1 to G7 and the respectively associated electric drive M1 to M6.

Figure 2:
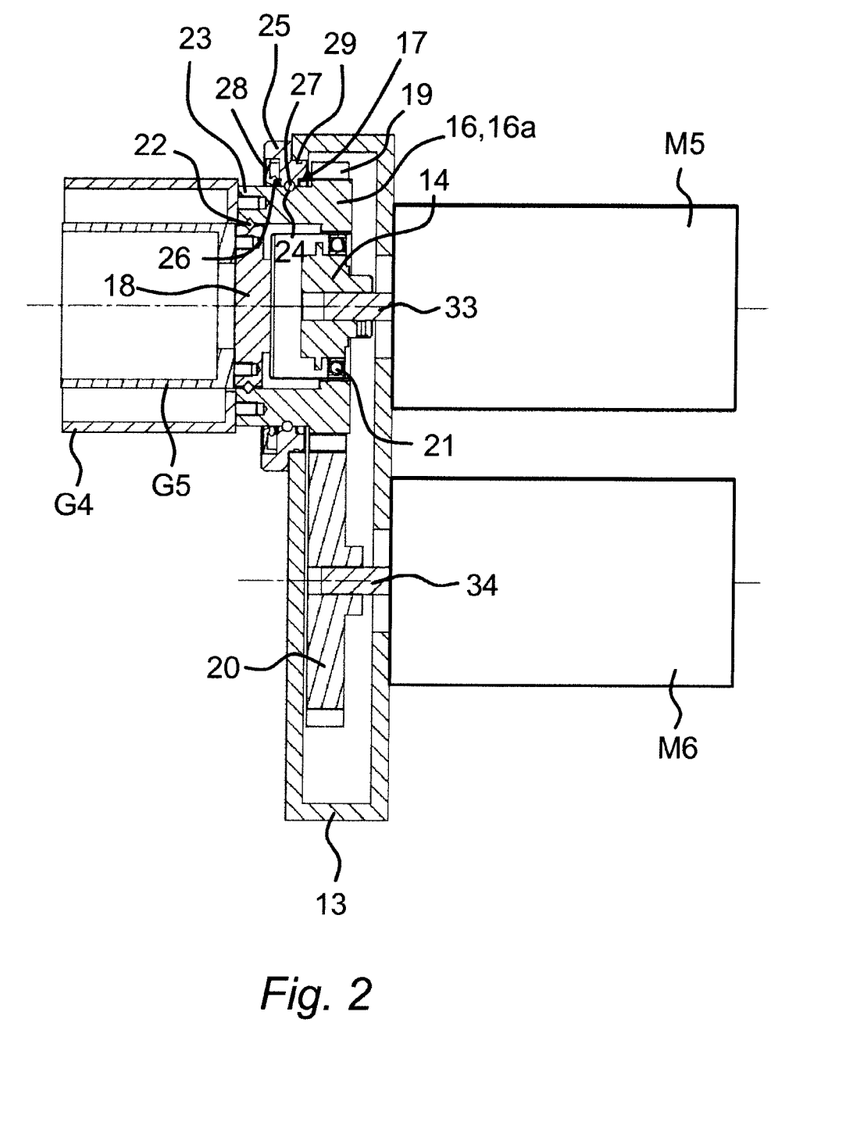
FIG. 2 is a sectional view of a part of an exemplary robot arm of an industrial robot that comprises an inventive transmission in a first embodiment.

FIG. 2 shows in detail a first exemplary embodiment of an inventive transmission 12.

The transmission 12 comprises a transmission housing 13. The transmission housing 13 may be formed by a link G1 to G7 of the robot arm 2. A driving member 14 is mounted rotatably relative to the transmission housing 13. In the illustrated exemplary embodiment this feature is achieved by the fact that the driving member 14 is mounted, as part of the preassembled subassembly, rotatably in a speed-changing transmission stage 15a of the transmission 12; and the speed-changing transmission stage 15a in turn is mounted rotatably on the transmission housing 13 by means of a transmission-stage rolling bearing device 17 by way of a torque supporting member 16. In the present case the speed-changing transmission stage 15a is designed as a single-stage harmonic drive reduction gear (strain wave gear), wherein the driving member 14 is formed by a wave generator 32. In the case of the exemplary embodiment shown in FIG. 2 to FIG. 6, the speed-changing transmission stage 15a is designed as a strain wave gear, which comprises a rigid outer ring 16b, which is connected to the torque supporting member 16 or is formed in one piece and which has internal gear teeth 30; a flexible output bushing 18a, which is connected to the output member 18 and which has external gear teeth 31; and the wave generator 32, which rolls on the flexible output bushing 18a and which is connected to the driving member 14, wherein the external gear teeth 31 of the flexible output bushing 18a are in meshing engagement with the internal gear teeth 30 of the rigid outer ring 16b, as a function of a rotational movement of the wave generator 32.

Furthermore, an output member 18 is mounted rotatably relative to the transmission housing 13. In the illustrated exemplary embodiment this aspect is achieved by the fact that the output member 18 is mounted, as part of the preassembled subassembly, like the driving member 14, in a rotatable manner in the speed-changing transmission stage 15a of the transmission 12; and the speed-changing transmission stage 15a in turn is mounted rotatably on the transmission housing 13 by means of the transmission stage rolling bearing device 17 by way of the torque supporting member 16. In the present case of the single-stage harmonic drive reduction gear the output member 18 is formed by the flexible output bushing 18a (flex spline) of the harmonic drive reduction gear; or the output member 18 is connected to at least the flexible output bushing 18a (flex spline) of the harmonic drive reduction gear. The associated rigid outer ring 16b (circular spline) of the harmonic drive reduction gear is connected to the torque supporting member 16 or even formed in one piece with said torque supporting member. In the case of the present exemplary embodiment the harmonic drive reduction gear represents a concrete embodiment of the at least one speed-changing transmission stage 15a that couples the output member 18 to the driving member 14. The torque supporting member 16 is part of the speed-changing transmission stage 15a, where in this case the driving member 14 forms a preassembled subassembly together with the output member 18 and the torque supporting member 16. The torque supporting member 16 is mounted rotatably on the transmission housing 13 by means of the transmission stage rolling bearing device 17. Furthermore, the torque supporting member 16 also comprises gear teeth 19, which are in engagement with a driving pinion 20 that is mounted rotatably in the transmission housing 13. In a modification, which is not shown in detail, a motor, in particular, an electric motor, or, more specifically, a drive may be connected directly to the driving pinion 20 by means of a drive shaft. Then the motor, in particular, the electric motor, or the drive may be connected to the driving pinion 20 without an interpositioned harmonic drive reduction gear (strain wave gear).

The driving member 14 is mounted rotatably on the torque supporting member 16 by means of a driving member rolling bearing device 21. For this purpose the driving member 14 does not have to be mounted necessarily immediately and/or directly on the torque supporting member 16, but rather can be mounted, as shown in FIG. 2, indirectly on the torque supporting member 16 and/or relative to the torque supporting member 16 by means of the flexible output bushing 18a (flex spline) of the harmonic drive reduction gear and the rigid outer ring 16b (circular spline) of the harmonic drive reduction gear.

The output member 18 is mounted rotatably on the torque supporting member 16 by means of an output member rolling bearing device 22. In the case of the present exemplary embodiment shown in FIG. 2, the output member 18 is actually mounted immediately and/or directly on the torque supporting member 16 by means of the output member rolling bearing device 22. However, in a modification, not shown herein, the output member 18 may also be mounted indirectly on the torque supporting member 16 and/or relative to the torque supporting member 16.

In the case of the present exemplary embodiment the torque supporting member 16 is formed by a support ring 16a, which is surrounded coaxially by the driving member 14 and the output member 18 and which has an outer peripheral wall 23, which bears at least one rolling body inner race 24 of the transmission stage rolling bearing device 17.

Moreover, the transmission stage rolling bearing device 17 also comprises an outer ring 25, which is flanged to the transmission housing 13 and which bears a rolling body outer race 27 directly or indirectly on its inner peripheral wall 26, for example, by means of a bearing ring. In addition, the outer ring 25 comprises a dynamic seal 28 that seals against the output member 18 or against the torque supporting member 16 or against the support ring 16a. In the present exemplary embodiment the dynamic seal 28 is designed as a radial shaft sealing ring. Furthermore, the outer ring 25 is also sealed against the transmission housing 13 by means of a static seal 29.

Figure 3:
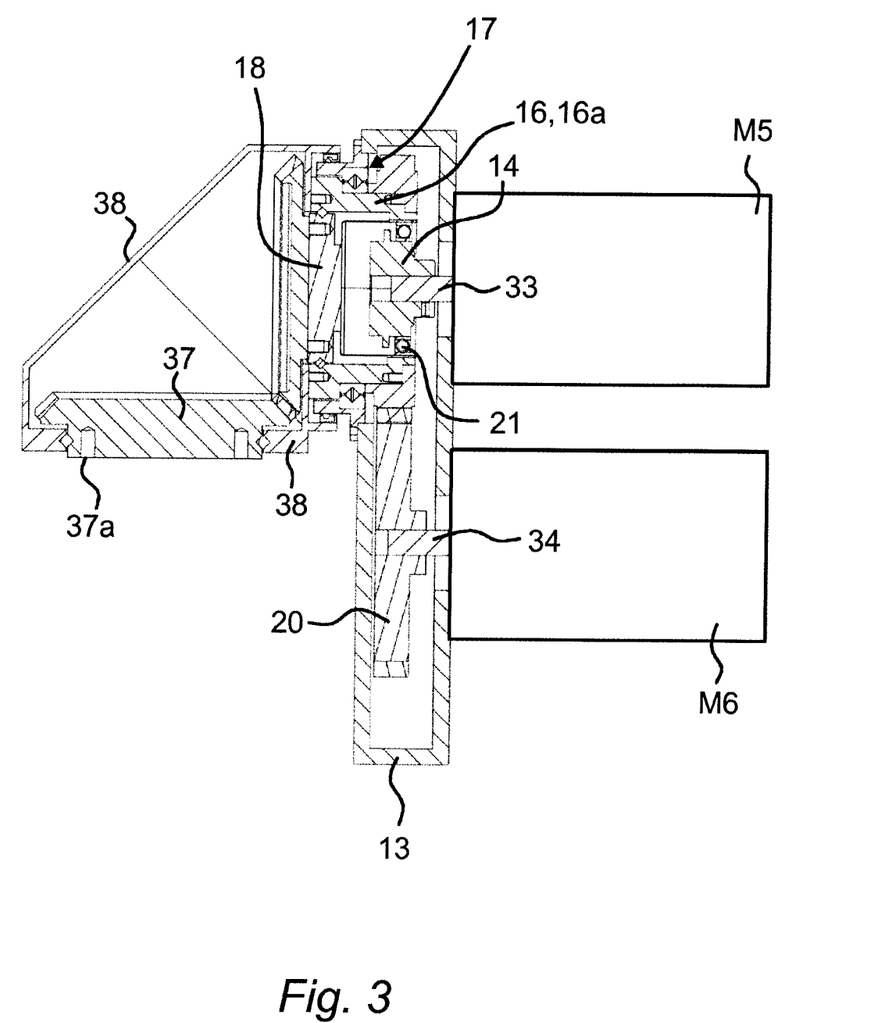
FIG. 3 is a sectional view of a part of an exemplary robot arm of an industrial robot that comprises an inventive transmission in a second embodiment.

Compared to the first embodiment shown in FIG. 2, in a second embodiment in accordance with FIG. 3, the transmission 12 is modified to the effect that the link G5 is not fastened to the output member 18, but rather a driving bevel gear 36, which meshes with an output bevel gear 37 that comprises a flange 37a, to which a link G1 to G7 of the robot arm 2 can be connected. This flange 37a is mounted rotatably in a hand housing 38, and said hand housing 38 of the robot arm 2 is connected to the torque supporting member 16 or the support ring 16a, which can be driven by the second electric motor M6 in a manner allowing rotation. Moreover, the transmission 12 of the second embodiment in accordance with FIG. 3 is, however, designed in a manner that is largely identical to that in the first embodiment, shown in FIG. 2.

The arrangements, shown in FIG. 2 and FIG. 3, make it possible to provide electric driving devices, comprising a first electric motor M5 with a primary drive shaft 33, a transmission 12, as described, wherein the primary drive shaft 33 of the first electric motor M5 is connected to the driving member 14 of the transmission 12, and comprising a second electric motor M6 with a secondary drive shaft 34, which is connected to the driving pinion 20 of the transmission 12.

Figure 4:
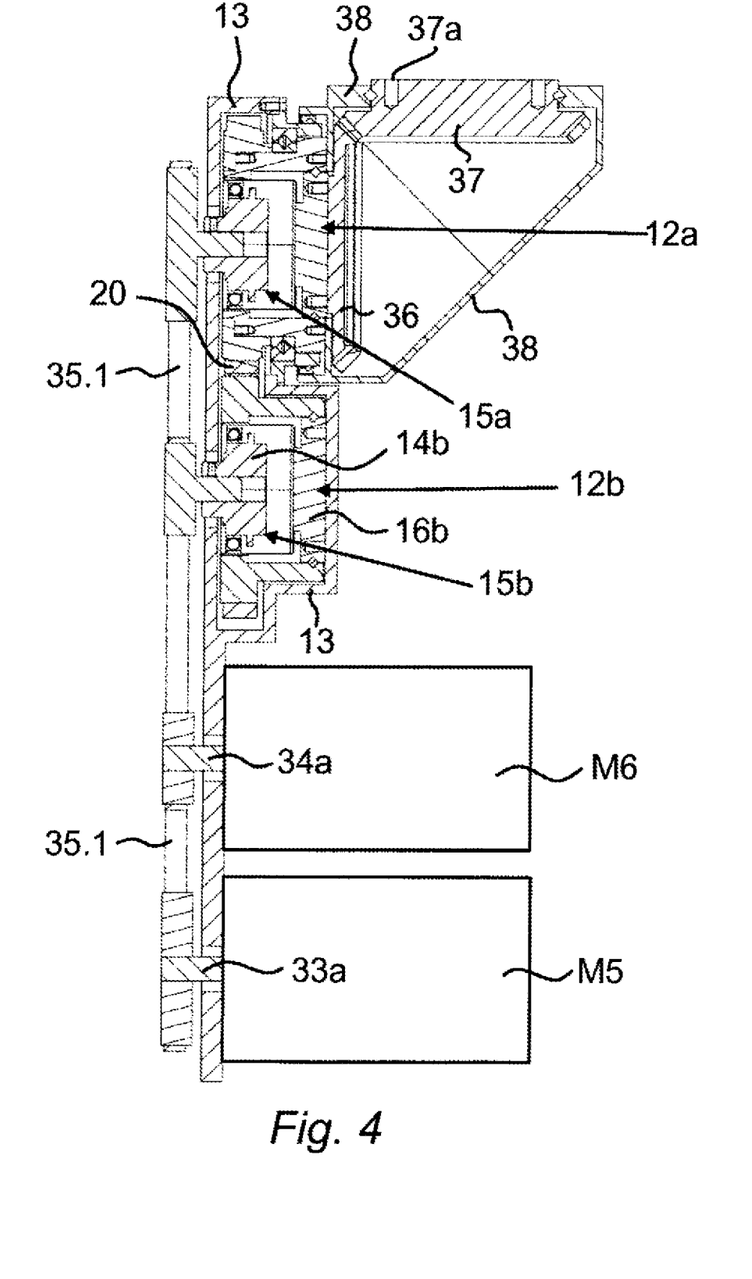
FIG. 4 is a sectional view of a part of an exemplary robot arm of an industrial robot that comprises an inventive transmission in a third embodiment.
Figure 5:
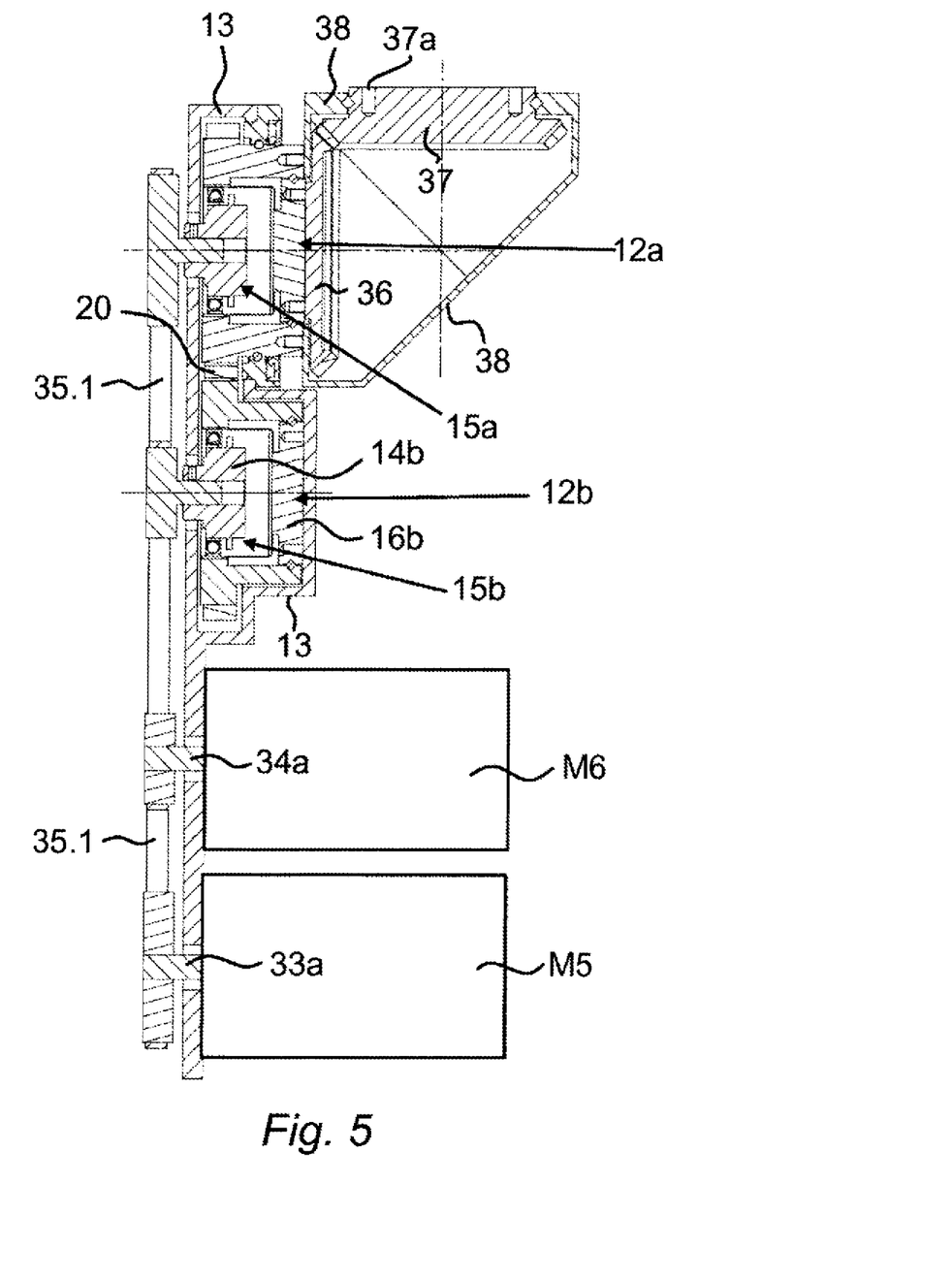
FIG. 5 is a sectional view of a part of an exemplary robot arm of an industrial robot that comprises an inventive transmission in a fourth embodiment.
Figure 6:
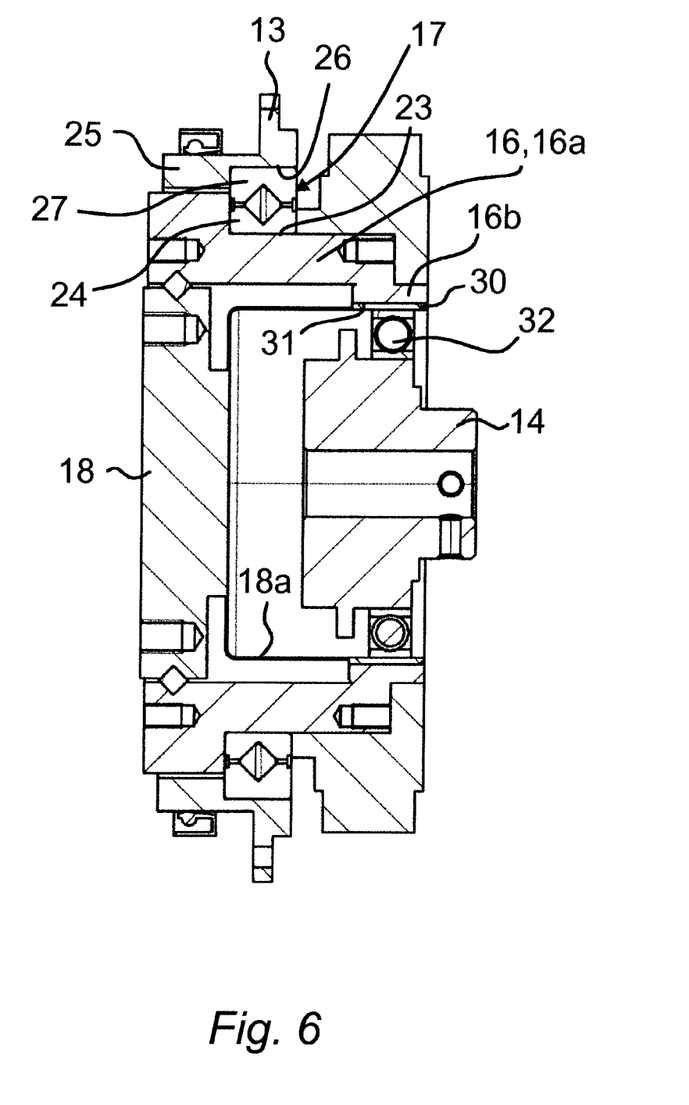
FIG. 6 is a sectional view of an exemplary embodiment of a preassembled subassembly of the inventive transmission, taken in isolation.

The arrangements, shown in FIG. 4 and FIG. 5, make it possible to provide electric driving devices, comprising a first electric motor M5 with a primary drive shaft 33a, a first transmission 12a, as described, wherein the primary drive shaft 33a of the first electric motor M5 is connected to a primary driving member 14a of the first transmission 12a by means of a first belt drive 35.1, and comprising a second electric motor M6 with a secondary drive shaft 34a; a second transmission 12b comprising a rotatably mounted secondary driving member 14b, to which the secondary drive shaft 34a of the second electric motor M6 is connected; a rotatably mounted secondary torque supporting member 16b, which bears the driving pinion 20 of the first transmission 12a, and at least one secondary speed-changing transmission stage 15b, which couples the secondary output member 18b to the secondary driving member 14b and which comprises a secondary output member 18b, wherein the secondary driving member 14b forms a second preassembled subassembly together with the secondary output member 18b and the secondary torque supporting member 16b; and the secondary torque supporting member 16b is fastened to the transmission housing 13 of the first transmission 12a. Moreover, the transmission 12 of the third and fourth embodiment according to FIG. 4 and FIG. 5 are designed, however, in a manner that is largely identical to that in the first and second embodiment according to FIG. 2 and FIG. 3.

Figure 7:
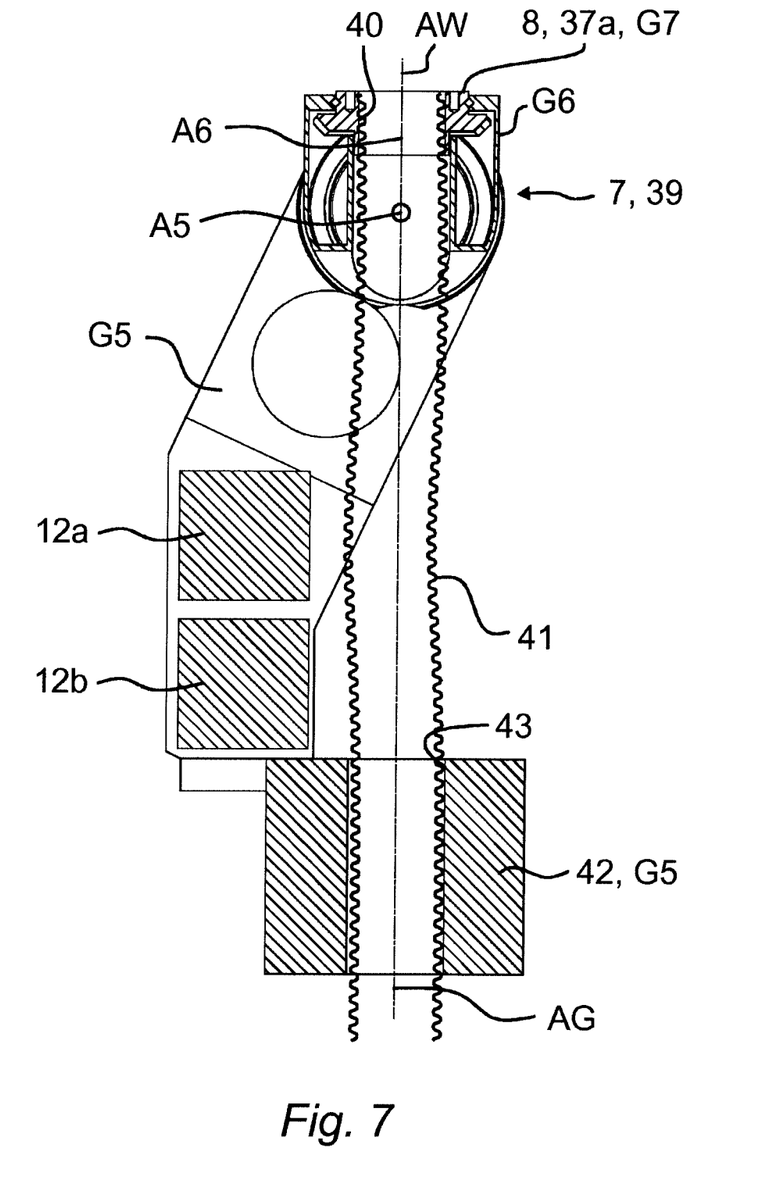
FIG. 7 is in schematic form, a sectional view of an exemplary variant of a robot arm of an industrial robot that comprises two inventive transmissions, which are arranged so as to be offset from a supply line.

In the variant of a robot arm 2 that is shown in schematic form in FIG. 7, this robot arm 2 comprises a hollow shaft robot hand 39 that comprises at least one rotatable hollow shaft 40, which is connected to the links G5 to G7. In the case of the present exemplary embodiment shown in FIG. 7, the hollow shaft 40 is connected to the flange 8, 37a of the robot arm 2. In addition, the robot arm 2 comprises a hollow member 42, which comprises at least one feedthrough 43 that is connected to one of the links G1 to G4. A supply line 41 is passed through both the feedthrough 43 and also the hollow shaft 40.

A first inventive transmission 12a is positioned between the hollow shaft robot hand 39 and the hollow member 42 in the kinematic chain of the plurality of links G1 to G7 and joints L1 to L6 of the robot arm 2. In addition, a second inventive transmission 12b in the kinematic chain of the plurality of links G1 to G7 and joints L1 to L6 of the robot arm 2 is also positioned between the hollow shaft robot hand 39 and the hollow member 42. In this case the first transmission 12a, the second transmission 12b and the electric motors M5 and M6 are arranged in the link 13 so as to be offset from the supply line 41 in such a way that in a link position of the robot arm 2, in which the axis AW of the hollow shaft 40 is aligned with the axis AG of the hollow member 42, as shown in FIG. 7, the supply line 41 can be guided in a straight alignment past the first transmission 12a and the second transmission 12b as well as the electric motors M5 and M6.

In the case of the present exemplary embodiment shown in FIG. 7, the hollow member 42 is the link G5, which is mounted on the joint L4 in a manner allowing rotation about the axis A4. In this case the first transmission 12a and the second transmission 12b are designed to move the hand axes A5 and A6, i.e., the joints L5 and L6. Owing to the fact that both the hollow member 42 and also the first transmission 12a and the second transmission 12b are components of the same joint L5, the geometric arrangement or rather the structural arrangement of the first transmission 12a and the second transmission 12b with respect to the feedthrough 43 of the hollow member 42 is fixed. The first transmission 12a and the second transmission 12b are arranged so as to be offset from the axis AG of the hollow member 42 in such a way that when the supply line 41 extends or rather is guided in a straight line along the aligned axes AG and AW to the hollow shaft 40 or to the flange 8, 37a of the robot arm 2, said supply line runs freely past the first transmission 12a and the second transmission 12b as well as the electric motors M5 and M6. To this end, even the link G5 itself has a shape that is designed in a such way that when the supply line 41 extends or rather is guided in a straight line along the aligned axes AG and AW to the hollow shaft 40 or the flange 8, 37a of the robot arm 2, said supply line can pass by unimpeded.

The supply line 41 can comprise, in particular, electric, hydraulic and/or pneumatic lines or cables. Correspondingly the supply line 41 can comprise one or more of such individual lines. The one or more individual lines may be combined to form a bundle of lines that form the supply line 41. For this purpose the supply line 41 may be provided with a protective tube. The protective tube may be a corrugated tube surrounding the individual lines and/or bundle of lines.

Figure 8:
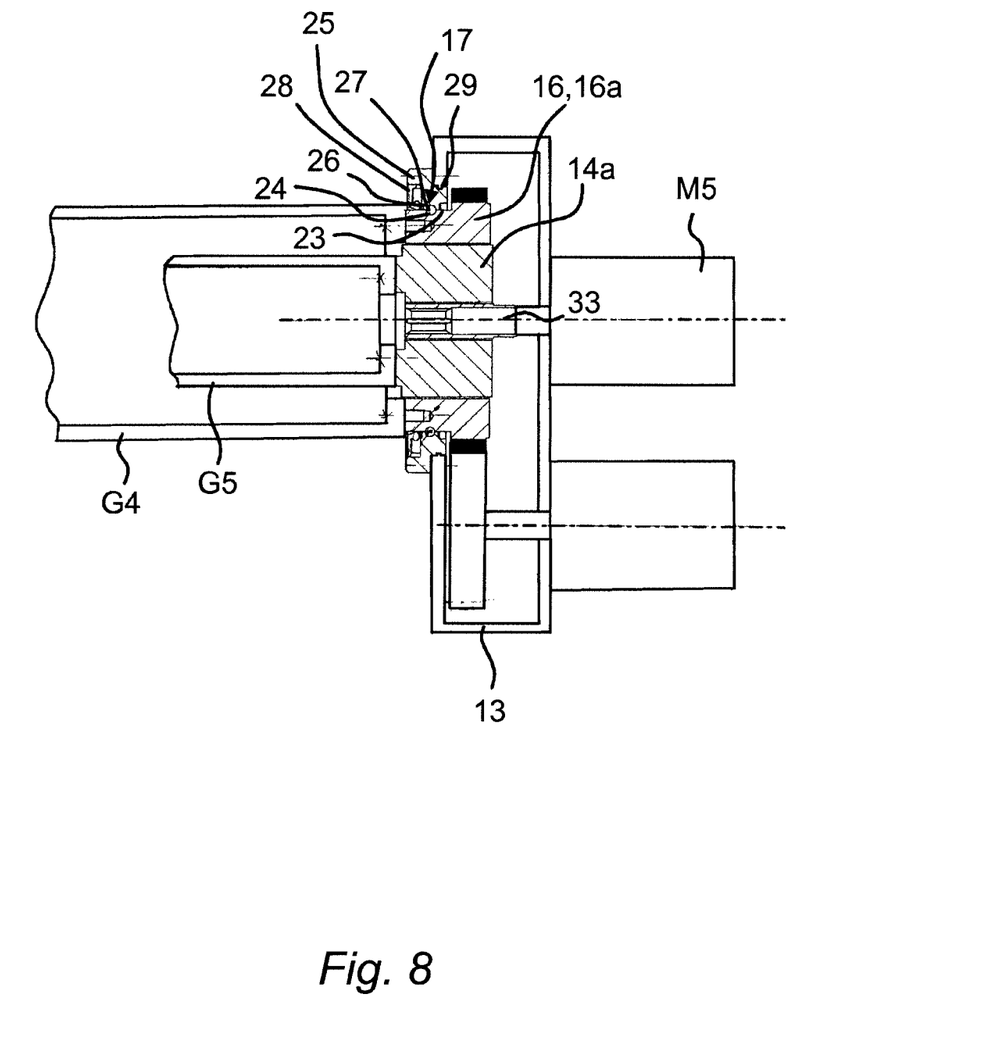
FIG. 8 is in schematic form, a sectional view of a part of a modified robot arm, where the transmission is designed as a simple rotary feedthrough.

FIG. 8 shows a modified embodiment. A rotary feedthrough 14a is mounted rotatably relative to the transmission housing 13. The rotary feedthrough 14a is mounted rotatably on the transmission housing 13 by means of the transmission stage rolling bearing device 17 by way of the torque supporting member 16. The rotary feedthrough 14a couples the drive shaft 33 directly to the link G5. In particular, a gear ratio of 1 to 1 (1:1) can be achieved by means of the rotary feedthrough 14a. This means that the rotary feedthrough 14a enables a transmission of a torque from the drive shaft 33 to the link G5, and the rotational speed of the drive shaft 33 and the link G5 stays the same.

In the case of this exemplary embodiment, the torque supporting member 16 is also formed by a support ring 16a, which coaxially surrounds the rotary feedthrough 14a and which has an outer peripheral wall 23, which bears at least one rolling body inner race 24. In addition, the transmission stage rolling bearing device 17 comprises, as in the other embodiment according to FIG. 2, an outer ring 25, which is flanged to the transmission housing 13 and which bears a rolling body outer race 27 on its inner peripheral wall 26 directly or indirectly, for example, by means of a bearing ring. In addition, the outer ring 25 comprises a dynamic seal 28 that seals against the torque supporting member 16 or, more specifically, the support ring 16a. In this case, too, the dynamic seal 28 is designed as a radial shaft sealing ring. Furthermore, the outer ring 25 is sealed against the transmission housing 13 by means of a static seal 29.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A transmission, comprising:
a transmission housing;
a driving member mounted rotatably in the transmission housing;
an output member mounted rotatably in the transmission housing; and
at least one speed-changing transmission stage coupling the output member to the driving member and comprising a torque supporting member;
the driving member, the output member, and the torque supporting member forming a preassembled subassembly;
in the preassembled subassembly, the torque supporting member is mounted rotatably on the transmission housing by a transmission stage rolling bearing device, and comprises gear teeth in engagement with a driving pinion that is mounted rotatably in the transmission housing;
wherein the driving member is rotatably mounted on the output member by a driving member rolling bearing device.

2. The transmission of claim 1, wherein the output member is rotatably mounted on the torque supporting member by an output member rolling bearing device.

3. The transmission of claim 1, wherein the torque supporting member is formed by a support ring coaxially surrounding at least one of the driving member or the output member, the support ring comprising an outer peripheral wall that carries at least one rolling body inner race of the transmission stage rolling bearing device.

4. The transmission of claim 3, wherein the transmission stage rolling bearing device comprises an outer ring that is flanged with the transmission housing and which carries at least one rolling body outer race on an inner peripheral wall thereof.

5. The transmission of claim 4, further comprising a static seal that seals the outer ring against the transmission housing.

6. The transmission of claim 4, further comprising a dynamic seal that seals the outer ring against the torque supporting member.

7. The transmission of claim 6, wherein the dynamic seal is a radial shaft sealing ring that seals the outer ring against the torque supporting member.

8. The transmission of claim 1, wherein the at least one speed-changing transmission stage comprises a strain wave gear, the strain wave gear comprising:
a rigid outer ring having internal gear teeth and that is one of connected to the torque supporting member, or is integrally formed with the torque supporting member;
a flexible output bushing connected to the output member and having external gear teeth; and
a wave generator that rolls on the flexible output bushing and which is connected to the driving member;
wherein the external gear teeth of the flexible output bushing are in meshing engagement with the internal gear teeth of the rigid outer ring as a result of a rotational movement of the wave generator.

9. The transmission of claim 1, wherein the at least one speed-changing transmission stage comprises at least one planetary gear stage.

10. An electric driving device, comprising:
a first electric motor with a primary drive shaft;
a transmission, comprising:
   a transmission housing,
   a driving member mounted rotatably in the transmission housing,
   an output member mounted rotatably in the transmission housing, and
   at least one speed-changing transmission stage coupling the output member to the driving member and comprising a torque supporting member,
   the driving member, the output member, and the torque supporting member forming a preassembled subassembly,
   in the preassembled subassembly, the torque supporting member is mounted rotatably on the transmission housing by a transmission stage rolling bearing device, and comprises gear teeth in engagement with a driving pinion that is mounted rotatably in the transmission housing;
wherein the primary drive shaft of the first electric motor is connected to the driving member of the transmission; and
a second electric motor with a secondary drive shaft connected to the driving pinion of the transmission.

11. An electric driving device, comprising:
a first electric motor with a primary drive shaft;
a first transmission, comprising:
   a transmission housing,
   a driving member mounted rotatably in the transmission housing,
   an output member mounted rotatably in the transmission housing, and
   at least one speed-changing transmission stage coupling the output member to the driving member and comprising a torque supporting member,
   the driving member, the output member, and the torque supporting member forming a preassembled subassembly,
   in the preassembled subassembly, the torque supporting member is mounted rotatably on the transmission housing by a transmission stage rolling bearing device, and comprises gear teeth in engagement with a driving pinion that is mounted rotatably in the transmission housing;
wherein the driving member is a primary driving member;
wherein the primary drive shaft of the first electric motor is connected to the primary driving member of the first transmission by a first belt drive; and
a second electric motor with a secondary drive shaft;
a second transmission comprising a rotatably mounted secondary driving member to which the secondary drive shaft of the second electric motor is connected by a second belt drive;
a rotatably mounted secondary torque supporting member that carries the driving pinion of the first transmission and at least one secondary speed-changing transmission stage;
wherein the at least one secondary speed-changing transmission stage couples the secondary torque supporting member to the secondary driving member and comprises a secondary output member;

wherein the secondary driving member, the secondary output member, and the secondary torque supporting member form a second preassembled subassembly; and
wherein the secondary output member is fastened to the transmission housing of the first transmission.

12. An industrial robot, comprising:
a robot controller configured to execute a robot program;
a robot arm with a plurality of links connected by joints that are automated in accordance with the robot program, or are automatically adjustable in a manual operating mode of the industrial robot; and
at least one transmission, comprising:
   a transmission housing,
   a driving member mounted rotatably in the transmission housing,
   an output member mounted rotatably in the transmission housing, and
   at least one speed-changing transmission stage coupling the output member to the driving member and comprising a torque supporting member,
   the driving member, the output member, and the torque supporting member forming a preassembled subassembly,
   in the preassembled subassembly, the torque supporting member is mounted rotatably on the transmission housing by a transmission stage rolling bearing device, and comprises gear teeth in engagement with a driving pinion that is mounted rotatably in the transmission housing;
the at least one transmission configured to adjust at least one of the joints of the robot arm that follow one another directly in a kinematic chain.

13. The industrial robot of claim 12, wherein the at least one transmission is configured to adjust two of the joints of the robot arm that follow one another directly in the kinematic chain.

14. An industrial robot, comprising:
a robot controller configured to execute a robot program;
a robot arm with a plurality of links connected by joints that are automated in accordance with the robot program, or are automatically adjustable in a manual operating mode of the industrial robot; and
at least one electric driving device as set forth in claim 10;
the electric driving device configured to adjust at least one of the joints of the robot arm that follow one another directly in a kinematic chain.

15. The industrial robot of claim 12, further comprising:
a hollow shaft robot hand, the robot hand comprising:
   at least one rotatable hollow shaft that is connected to one of the links of the robot arm,
   a hollow member comprising at least one feedthrough that is connected to one of the links, and
   a supply line that is guided through both the at least one feedthrough and also the at least one hollow shaft;
wherein the at least one transmission comprises a first transmission and a second transmission, the first and second transmissions positioned between the hollow shaft robot hand and the hollow member in the kinematic chain of the plurality of links and joints of the robot arm; and
wherein the first transmission and the second transmission are arranged in the link to which the at least one rotatable hollow shaft is connected so as to be offset from the supply line in such a way that, in one joint position of the robot arm in which the longitudinal axis of the hollow shaft is aligned with the longitudinal axis of the hollow member, the supply line can be guided in a straight alignment past the first transmission and the second transmission.

16. The industrial robot of claim 15, wherein the least one rotatable hollow shaft is connected to a flange of the robot arm.

17. The industrial robot of claim 15, wherein:
first and second electric motors are connected to the respective driving members of the first and second transmissions; and
the first and second electric motors are arranged in the link so as to be offset from the supply line in such a way that, in one joint position of the robot arm in which the axis of the hollow shaft is aligned with the axis of the hollow member, the supply line can be guided in a straight alignment past the first transmission and the second transmission.

* * * * *